Nov. 5, 1957 A. T. ATRILL 2,812,114
SALT AND PEPPER SHAKER
Filed July 29, 1954

INVENTOR
Arthur T. Atrill
Ralph Burch
Attorney

United States Patent Office 2,812,114
Patented Nov. 5, 1957

2,812,114

SALT AND PEPPER SHAKER

Arthur Thomas Atrill, London, Ontario, Canada

Application July 29, 1954, Serial No. 446,508

1 Claim. (Cl. 222—142.4)

This invention relates generally to condiment dispensers, and in particular to a combination salt and pepper shaker in which a single container is adapted to hold both condiments, and one of the principal objects of the invention is to provide a dispenser from which either condiment can be freely poured out.

Another object of this invention is the provision of a combination salt and pepper shaker in which a single container is divided into two compartments allowing for the dispensing of either salt or pepper as desired.

A further object of the invention is the provision of a salt and pepper shaker, which is inexpensive to manufacture, yet strong and efficient in operation, and which avoids the use of separate containers, and is readily manufactured in large quantities.

The foregoing and other objects and advantages of the invention will appear more fully hereinafter from a consideration of the detailed description which follows, taken together with the accompanying drawings as illustrated by way of example, in which.

Similar reference numerals designate corresponding parts in both figures of the drawings.

Figures 1, 2:
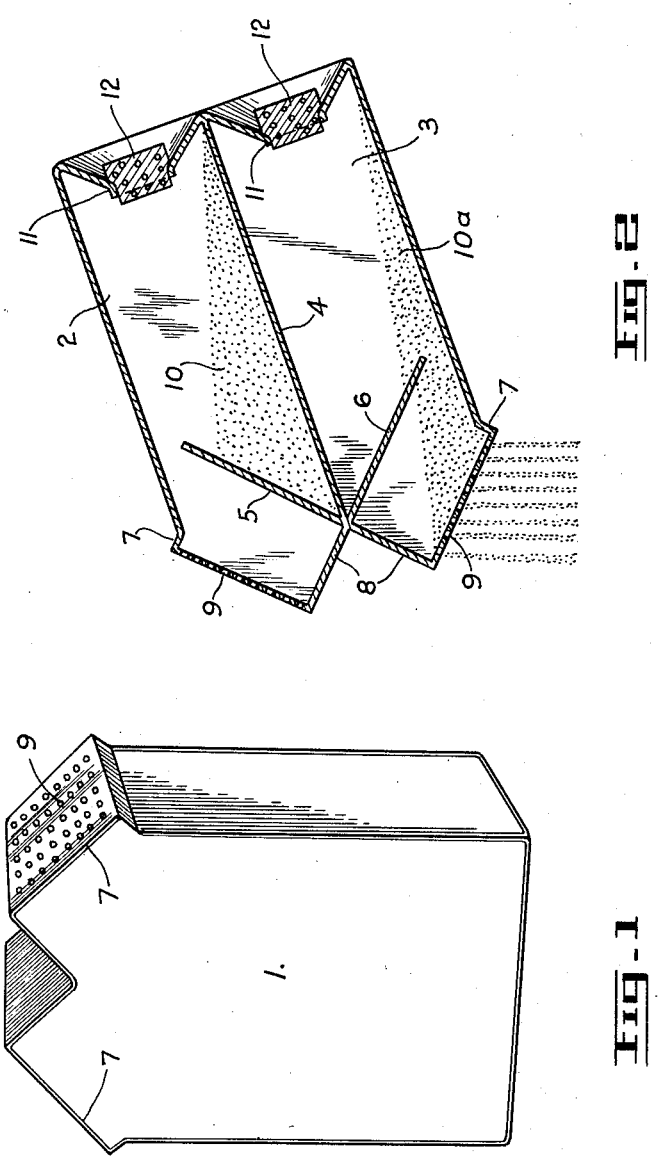
Figure 1 is a general view in perspective, of my improved combination salt and pepper shaker.
Figure 2 is a sectional view of the combination shaker, showing the method by which one of the condiments may be dispensed separately.

Referring now to the drawings my combination salt and pepper shaker is designated generally by the numeral 1, and consists of a container, shown by way of example, having an oblong configuration, but which may be manufactured in any conventional shape, such as round, square, or oval, to suit the public demand.

The container is divided into two chambers 2 and 3, respectively, by a central partition 4, and adjacent the upper end of partition 4 are formed baffles 5 and 6, extending angularly in a downward direction into the perspective chambers. The upper part of each chamber is closed by angularly outwardly extending portions 7, formed integrally with the upper part of the container, the closure extensions forming a central V-shaped portion 8, the bottom part of said V-shaped portion abutting the upper part of partition 4, the outwardly extending portions 7 having perforations 9, for the dispensing of condiments 10 and 10a. The base of each chamber is provided with an opening 11, through which a condiment is poured to fill the chamber, said opening having a stopper, such as a cork 12, inserted therein. In use, it will easily be seen that when the container is tipped over with the chamber 3 on the under side the condiment 10a will be dispensed, and at the same time the condiment 10 will be prevented from being discharged by baffle 5.

It will also be noted that baffle 6 exercises a retarding effect in connection with the dispensing of condiment 10a.

Without further detailed description it will be seen that I have provided a combination salt and pepper shaker, which is simple and inexpensive to manufacture, and at the same time is both strong and efficient in operation and avoids the necessity of using separate containers.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of co-operating parts may be resorted to within the scope of what is claimed without departing from the spirit of the invention.

I claim:

A salt and pepper shaker comprising a container having a bottom wall and perpendicular side and end walls, a perpendicular partition between the side walls dividing the container into compartments, said partition being of greater height than the end walls, baffles inclined downwardly and outwardly from the upper end of said partition towards the end walls, terminating below the upper end of the end walls in spaced relation thereto and discharge nozzles formed integrally with the upper end of said compartments having inner end walls disposed at right angles to each other and in the same plane as said baffles and perforated outer walls inclined downwardly from the inner end walls in parallel relation to said baffles and connected to the upper edge of the end walls of said container, the bottom wall of said container having openings for filling each of said compartments.

References Cited in the file of this patent

UNITED STATES PATENTS

| | | |
|---|---|---|
| 1,362,442 | Schneider | Dec. 14, 1920 |
| 2,135,848 | Sandstrom | Nov. 8, 1938 |
| 2,173,542 | Simington | Sept. 19, 1939 |
| 2,679,952 | Carpenter | June 1, 1954 |